(12) United States Patent
McClendon et al.

(10) Patent No.: US 6,862,175 B1
(45) Date of Patent: Mar. 1, 2005

(54) MEMORY CARD CONTAINER

(75) Inventors: Philip Scott McClendon, Cupertino, CA (US); Kurt John Baumberger, Atlanta, GA (US)

(73) Assignee: Mobile Digital Media, Inc., Mountain View, CA (US)

( * ) Notice: Subject to any disclaimer, the term of this patent is extended or adjusted under 35 U.S.C. 154(b) by 69 days.

(21) Appl. No.: 10/445,269

(22) Filed: May 23, 2003

(51) Int. Cl.⁷ .............................................. H05K 1/14
(52) U.S. Cl. ................... 361/685; 361/740; 439/159; 235/492
(58) Field of Search ............................... 361/683–686, 361/737, 740, 747, 754, 759; 439/153, 155, 159; 455/41; 248/917; 235/492

(56) References Cited

U.S. PATENT DOCUMENTS

| | | |
|---|---|---|
| 5,542,531 A | 8/1996 | Yeung |
| 5,775,490 A | 7/1998 | Baker et al. |
| 5,819,929 A | 10/1998 | Chung |
| 5,829,584 A | 11/1998 | Raucci, Jr. |
| 5,839,575 A | 11/1998 | Blanco |
| 5,894,924 A | 4/1999 | Koch |
| 6,069,795 A * | 5/2000 | Klatt et al. ................. 361/737 |
| 6,147,861 A * | 11/2000 | Iwasaki ....................... 361/684 |
| 6,222,726 B1 * | 4/2001 | Cha ............................. 361/683 |
| 6,590,778 B1 * | 7/2003 | Hojo et al. .................. 361/737 |

OTHER PUBLICATIONS

Handmark Company, Expansion card case design found at http://www.handmark.com/products/category.php?cat=21.

* cited by examiner

Primary Examiner—Hung Van Duong
(74) Attorney, Agent, or Firm—Cooley Godward LLP

(57) ABSTRACT

A memory card container includes a memory card holder, which includes a front region and a rear region. The front region is configured to engage the rear region to define therebetween a first compartment, and the first compartment is configured to contain a memory card. The memory card container also includes a memory card case, which includes a front portion and a rear portion. The front portion is configured to engage the rear portion to define therebetween a second compartment, and the second compartment is configured to contain the memory card holder. One of the front portion and the rear portion includes a retaining member. The retaining member is configured to engage the memory card holder to retain the memory card holder in the second compartment. The front portion includes an observation window. The observation window is configured to provide a view of the memory card holder in the second compartment.

16 Claims, 4 Drawing Sheets

MEMORY CARD CONTAINER

BRIEF DESCRIPTION OF THE INVENTION

The present invention relates generally to containers. More particularly, the present invention relates to memory card containers.

BACKGROUND OF THE INVENTION

Portable devices, such as mobile phones, laptop computers, handheld computers, portable audio equipment, and digital cameras, have become increasingly powerful in terms of their processing ability. In response to such increased processing ability, there has been a proliferation of available peripheral devices for use with such portable devices. A common type of peripheral device is a memory card. As used herein, the term "memory card" refers to any storage medium that can be accessed by an electronic device, such as a portable device. The storage medium may be read-only or read-write and, in some instances, may include active control logic. Examples of memory cards include CompactFlash cards, Memory Sticks, MultiMedia cards, Secure Digital cards, and SmartMedia cards. Memory cards can offer "plug and play" software capability, reduced memory usage, portability, and high-density storage. Memory cards are available in different sizes but are generally compact in size with surface dimensions that are typically no larger than that of a postage stamp.

Once manufactured, a memory card is typically placed in a package, such as a clamshell-type plastic package, and then shipped to a retailer. One limitation of existing packages is that memory cards are often easily stolen by simply cutting open the packages with a sharp object to remove the memory cards from the packages. In addition, existing packages for memory cards are often compact in size and can be easily concealed in an article of clothing. Because of fear of theft, retailers are often reluctant to display memory cards in their packages without direct supervision. Another limitation of existing packages is that different types of packages are often required to accommodate memory cards having different sizes. A further limitation of existing packages is that the packages typically serve no useful purpose subsequent to purchase and are often simply discarded once memory cards are removed from the packages.

It is against this background that a need arose to develop the memory card container described herein.

SUMMARY OF THE INVENTION

In one innovative aspect, the present invention relates to a memory card container. In one embodiment, the memory card container includes a memory card holder. The memory card holder includes a front region and a rear region. The front region is configured to engage the rear region to define therebetween a first compartment, and the first compartment is configured to contain a memory card. The memory card container also includes a memory card case. The memory card case includes a front portion and a rear portion. The front portion is configured to engage the rear portion to define therebetween a second compartment, and the second compartment is configured to contain the memory card holder. One of the front portion and the rear portion includes a retaining member. The retaining member is configured to engage the memory card holder to retain the memory card holder in the second compartment. The front portion includes an observation window. The observation window is configured to provide a view of the memory card holder in the second compartment.

In another embodiment, the memory card container includes a memory card case. The memory card case includes a front portion and a rear portion. The front portion includes an observation window and a retaining member, and the retaining member is configured to retain a memory card holder such that the memory card holder is adjacent to the observation window. The front portion is movably coupled to the rear portion to provide movement of the front portion, with respect to the rear portion, between an open position and a closed position. The front portion in the closed position is configured to engage the rear portion to contain the memory card holder between the front portion and the rear portion.

In a further embodiment, the memory card container includes a memory card holder. The memory card holder includes a front region and a rear region. The front region is substantially transparent. One of the front region and the rear region includes a key coupling member. The front region is movably coupled to the rear region to provide movement of the front region, with respect to the rear region, between an open position and a closed position. The front region in the closed position is configured to engage the rear region to contain at least one memory card between the front region and the rear region.

BRIEF DESCRIPTION OF THE DRAWINGS

For a better understanding of the nature and objects of the present invention, reference should be made to the following detailed description taken in conjunction with the accompanying drawings, in which.

DETAILED DESCRIPTION

Figure 1:
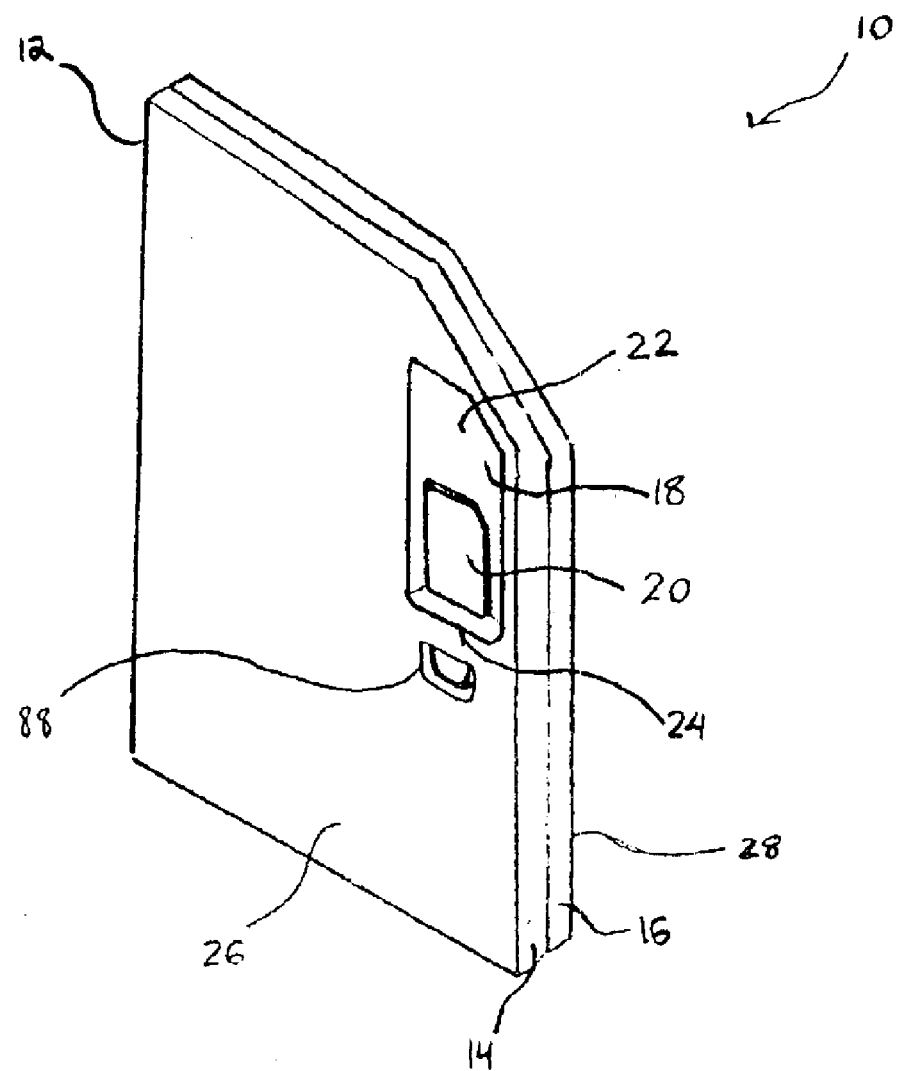
FIG. 1 illustrates a perspective view of a memory card container, according to an embodiment of the invention.

FIGS. 1 through 4 illustrate an embodiment of a memory card container 10 in accordance with the present invention. The memory card container 10 can serve as a package for storing one or more memory cards. As illustrated in FIG. 1, the memory card container 10 includes a memory card case 12, which includes a front portion 14 and a rear portion 16. The front portion 14 is configured to engage the rear portion 16 to define a compartment therebetween. The memory card case 12 can serve as an outer package for one or more memory cards. Advantageously, the memory card case 12 is sized to discourage theft and facilitates unsupervised display of the memory card container 10 by a retailer. In addition, the memory card case 12 can be shaped with a standard package convention to allow easy identification of the contents of the memory card container 10 and to attract consumer attention. As illustrated in FIG. 1, the memory card case 12 may have dimensions that are similar to that of a conventional Digital Video Disc ("DVD") case.

In the illustrated embodiment, the memory card container 10 also includes a memory card holder 18, which is contained in the compartment defined by the front portion 14 and the rear portion 16. The memory card holder 18 is configured to contain one or more memory cards. Advantageously, the memory card holder 18 can be configured to contain multiple memory cards. As illustrated in FIG. 1, the memory card holder 18 contains a memory card 20. The memory card holder 18 can serve as an inner package for the memory card 20. Subsequent to purchase of the memory card 20, the memory card holder 18 also can serve as a convenient carrying case for the memory card 20 as well as other memory cards. Advantageously, the memory card holder 18 allows storage as well as the ability to easily transport one or more memory cards. In the illustrated embodiment, a front region 22 of the memory card holder 18 is substantially transparent and may be formed of a transparent or translucent material, such as a transparent or translucent plastic.

Returning to the memory card case 12, the front portion 14 includes an observation window 24. In the illustrated embodiment, the observation window 24 is formed as an opening in the front portion 14. It is contemplated that this opening may be covered with a transparent or translucent member that is coupled to or formed integrally with the front portion 14. As illustrated in FIG. 1, the memory card holder 18 is adjacent to the observation window 24 to allow a view of the contents of the memory card holder 18, namely the memory card 20. Advantageously, the configuration and positioning of the memory card holder 18 allow a consumer to view the dimensions, shape, and indicia of the memory card 20 in the memory card container 10 and to make an educated purchase of the memory card 20. Moreover, such configuration and positioning create a desirable appearance that the memory card 20 is "floating" in the memory card container 10.

Referring to FIG. 1, the front portion 14 and rear portion 16 include outer sides 26 and 28, respectively. Various types of indicia, such as indicia relating to the memory card 20, may be disposed on one, or both, of the outer sides 26 and 28. It is contemplated that such indicia may be formed on a display element, such as a sticker or a paper, and the display element may be coupled to one, or both, of the outer sides 26 and 28. It is also contemplated that such indicia may be formed integrally on one, or both, of the outer sides 26 and 28. As illustrated in FIG. 1, the front portion 14 includes an opening 88, which is discussed further below in connection with FIG. 3.

Figure 2:
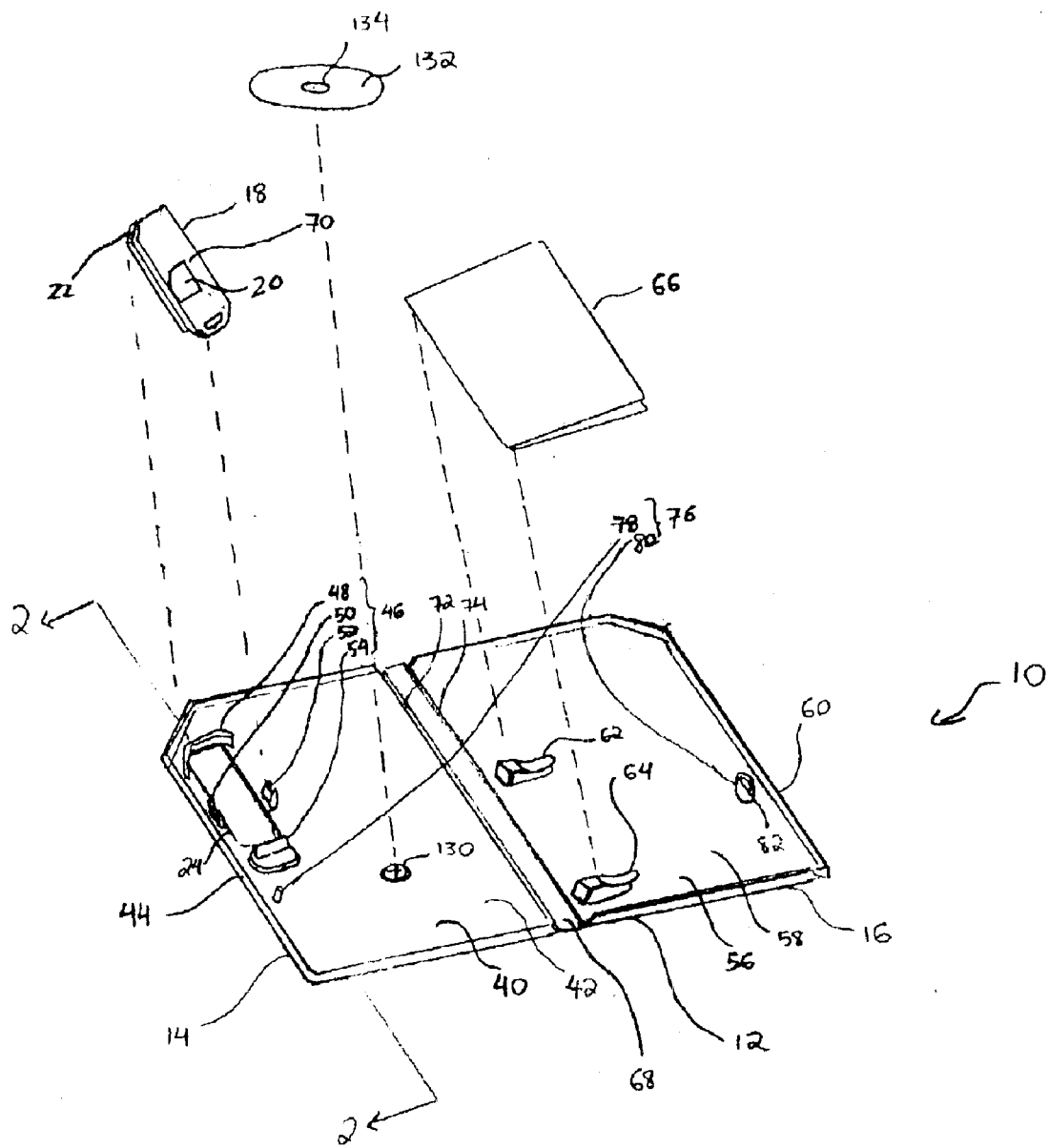
FIG. 2 illustrates a perspective view of the memory card container of FIG. 1 with a memory card case in an open configuration.

Attention next turns to FIG. 2, which illustrates the memory card container 10 with the memory card case 12 in an open configuration. As discussed previously, the memory card case 12 includes the front portion 14 and the rear portion 16. In the illustrated embodiment, the front portion 14 includes a front plate 40 having an inner side 42. The front portion 14 also includes a front wall 44, which is disposed adjacent to a periphery of the front plate 40 and extends from the inner side 42 of the front plate 40. The front wall 44 may be coupled to or formed integrally with the front plate 40.

In the illustrated embodiment, the front plate 40 includes the observation window 24, which is formed as an opening extending through the front plate 40. The front plate 40 also includes a retaining member 46, which may be coupled to or formed integrally with the front plate 40. The retaining member 46 is configured to releasably engage the memory card holder 18 to retain the memory card holder 18 adjacent to the front plate 40. More particularly, the retaining member 46 is configured to retain the memory card holder 18, such that the memory card holder 18 is adjacent to the observation window 24 at the inner side 42 of the front plate 40. While the retaining member 46 is shown included in the front portion 14, it is contemplated that the retaining member 46 may be included in the rear portion 16, according to another embodiment of the invention.

In the illustrated embodiment, the retaining member 46 includes several cooperating retaining elements, including a groove element 48, side extensions 50 and 52, and a pivoting element 54. These retaining elements are configured to retain the memory card holder 18 with its front region 22 adjacent to and aligned with the observation window 24. As illustrated in FIG. 2, the groove element 48, the side extensions 50 and 52, and the pivoting element 54 are disposed at respective locations adjacent to a periphery of the observation window 24 and extend from the inner side 42 of the front plate 40. The groove element 48 and the pivoting element 54 are configured to engage top and bottom ends of the memory card holder 18, respectively, while the side extensions 50 and 52 are configured to engage opposite sides of the memory card holder 18.

Figure 3:
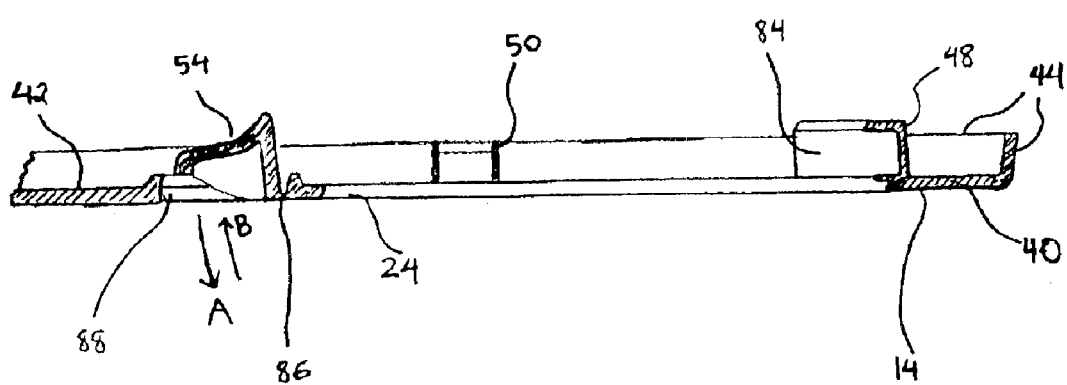
FIG. 3 illustrates a cross-sectional view of a front portion of the memory card case of FIG. 2.

The operation of the retaining member 46 can be further understood with reference to FIG. 3, which illustrates a cross-sectional view of the memory card case 12, taken along line 2—2 of FIG. 2. As illustrated in FIG. 3, the groove element 48 defines a recess 84 configured to accommodate the top end of the memory card holder 18. The pivoting element 54 is configured to move between a locked position and an unlocked position. Referring to FIG. 3, the pivoting element 54 is pivotable about a hinge 86 disposed in the front plate 40. The hinge 86 may be formed as a "living" or actual hinge. When depressed, the pivoting element 54 pivots away from the groove element 48 in the direction of arrow A into the unlocked position. In this unlocked position, the memory card holder 18 can be inserted into the recess 84 of the groove element 48 and between the side extensions 50 and 52 (see also FIG. 2). Once released, the pivoting element 54 pivots back towards the groove element 48 in the direction of arrow B into the locked position. In this locked position, the pivoting element 54 engages the bottom end of the memory card holder 18 and presses the memory card holder 18 against the groove element 48, thus retaining the memory card holder 18 in place. The memory card holder 18 can be subsequently removed by depressing the pivoting element 54. In the illustrated embodiment, the front plate 40 includes the opening 88 to allow movement of the pivoting element 54 between the locked position and the unlocked position. Alternatively, or in conjunction, it is contemplated that the front plate 40 may be recessed to allow movement of the pivoting element 54.

Returning to FIG. 2, the front plate 40 also includes a disc coupling member 130, which may be coupled to or formed integrally with the front plate 40. The disc coupling member 130 is configured to releasably engage a disc-shaped storage medium 132, such as a mini Compact Disc ("mini CD"), to retain the storage medium 132 adjacent to the front plate 40. The disc coupling member 130 can be implemented in a conventional fashion to engage an opening 134 of the storage medium 132. While the disc coupling member 130 is shown included in the front portion 14, it is contemplated that the disc coupling member 130 may be included in the rear portion 16, according to another embodiment of the invention.

In the illustrated embodiment, the rear portion 16 includes a rear plate 56 having an inner side 58. The rear portion 16 also includes a rear wall 60, which is disposed adjacent to a periphery of the rear plate 56 and extends from the inner side 58 of the rear plate 56. The rear wall 60 may be coupled to or formed integrally with the rear plate 56.

As illustrated in FIG. 2, the rear portion 16 includes retaining clips 62 and 64, which may be coupled to or formed integrally with the rear plate 56. The retaining clips 62 and 64 are configured to retain graphics or text material 66, such as a booklet containing information relating to the memory card 20.

In the illustrated embodiment, the front portion 14 is movably coupled to the rear portion 16, such that the front portion 14 can be moved, with respect to the rear portion 16, between a closed position, such as illustrated in FIG. 1, and an open position, such as illustrated in FIG. 2. As illustrated in FIG. 2, the memory card case 12 includes a spine member 68 coupling the front portion 14 to the rear portion 16. The spine member 68 is hingedly coupled to the front plate 40 and the rear plate 56 via hinges 72 and 74, respectively. The hinges 72 and 74 may be formed as "living" or actual hinges. When the front portion 14 is in a closed position, the front wall 44 is configured to engage the rear wall 60 to contain the memory card holder 18 between the front portion 14, the spine member 68, and the rear portion 16.

Desirably, the memory-card case 12 includes a locking member 76, which is configured to retain the front portion 14 in a closed position. In the illustrated embodiment, the locking member 76 includes a set of cooperating locking elements, including a front locking element 78 and a rear locking element 80. The front locking element 78 is configured to releasably-engage the rear locking element 80 to retain the front portion 14 in a closed position. As illustrated in FIG. 2, the front locking element 78 extends from the inner side 42 of the front plate 40 and may be coupled to or formed integrally with the front plate 40. The rear locking element 80 extends from the inner side 58 of the rear plate 56 and may be coupled to or formed integrally with the rear plate 56. As illustrated in FIG. 2, the rear locking element 80 includes an opening 82 configured to accommodate the front locking element 78.

As illustrated in FIG. 2, the memory card holder 18 includes the front region 22 and a rear region 70. The front region 22 is configured to engage the rear region 70 to define a compartment therebetween, which compartment is configured to contain the memory card 20. Advantageously, this compartment is configured to accommodate memory cards having different sizes. Accordingly, the memory card holder 18, in conjunction with the memory card case 12, can serve as an "universal" package for various types of memory cards having different sizes.

In the illustrated embodiment, the rear region 70 is substantially transparent and may be formed of a transparent or translucent material, such as a transparent or translucent plastic. It is contemplated that the rear region 70 may be formed of an opaque material, such as an opaque plastic, according to another embodiment of the invention.

Figure 4:
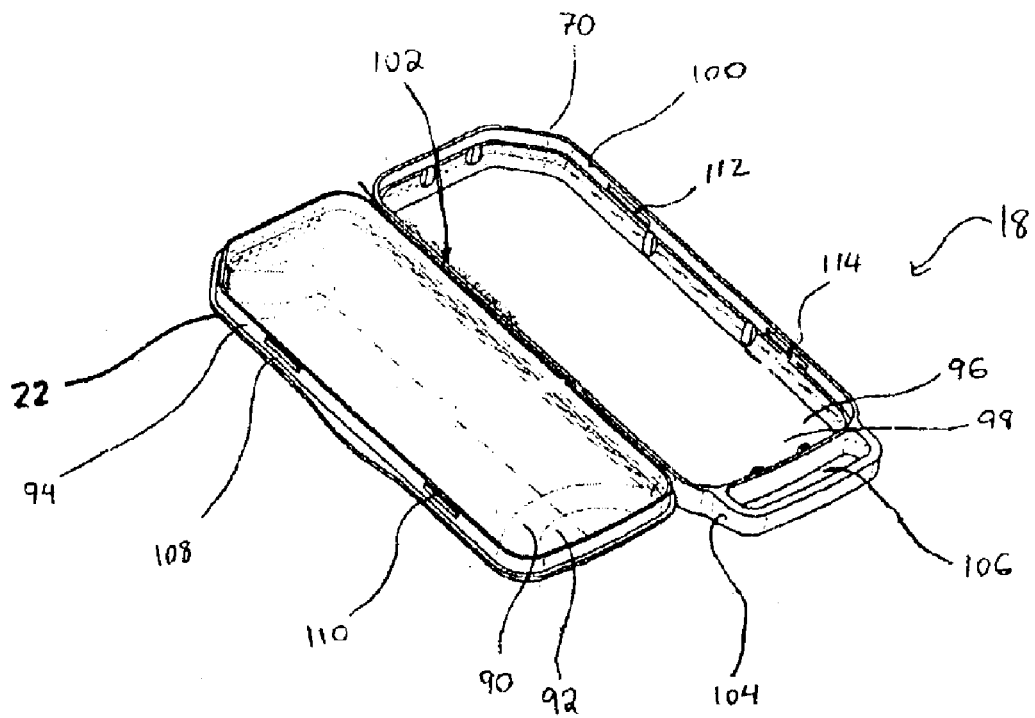
FIG. 4 illustrates a perspective view of a memory card holder included in the memory card container of FIG. 1.

Attention next turns to FIG. 4, which illustrates the memory card holder 18 in an open configuration. In the illustrated embodiment, the front region 22 includes a front panel 90 having an inner side 92. The front region 22 also includes a front wall 94, which is disposed adjacent to a periphery of the front panel 90 and extends from the inner side 92 of the front panel 90. The front wall 94 may be coupled to or formed integrally with the front panel 90.

The rear region 70 includes a rear panel 96 having an inner side 98. The rear region 70 also includes a rear wall 100, which is disposed adjacent to a periphery of the rear panel 96 and extends from the inner side 98 of the rear panel 96. The rear wall 100 may be coupled to or formed integrally with the rear panel 96.

As discussed previously, the memory card holder 18 can serve as a convenient carrying case for the memory card 20 as well as other memory cards subsequent to their purchase. To further enhance such capability, the rear region 70 desirably includes a key coupling member 104, which is configured to engage a key ring. In the illustrated embodiment, the key coupling member 104 extends from the rear wall 100 and includes an opening 106 configured to engage a key ring that may retain a set of keys. The key coupling member 104 may be coupled to or formed integrally with the rear wall 100. While the key coupling member 104 is shown included in the rear region 70, it is contemplated that the key coupling member 104 may be included in the front region 22, according to another embodiment of the invention.

In the illustrated embodiment, the front region 22 is movably coupled to the rear region 70, such that the front region 22 can be moved, with respect to the rear region 70, between a closed position, such as illustrated in FIG. 2, and an open position, such as illustrated in FIG. 4. As illustrated in FIG. 4, the front region 22 is hingedly coupled to the rear region 70 via a hinge 102, which may be formed as a "living" or actual hinge. When the front region 22 is in a closed position, the front wall 94 is configured to engage the rear wall 100 to contain one or more memory cards between the front region 22 and the rear region 70. As illustrated in FIG. 4, the front region 22 includes front locking elements 108 and 110, which may be coupled to or formed integrally with the front wall 94. The rear wall 100 includes openings 112 and 114. The openings 112 and 114 are configured to accommodate the front locking elements 108 and 110 to retain the front region 22 in a closed position.

It should be recognized that the specific embodiments discussed above are provided by way of example, and various other embodiments are encompassed by the present invention. For instance, with reference to FIG. 4, the memory card holder 18 may include a biasing member, according to another embodiment of the invention. The biasing member may be configured to engage a memory card, such that the memory card is disposed adjacent to and aligned with the front region 22 in a closed position. Advantageously, the biasing member may serve to facilitate a view of the memory card that is contained in the memory card holder 18. The biasing member may-be implemented, for example, as a pivotable extension that is coupled to or formed integrally with the rear region 70. As another example, a memory card case may include a retaining member configured to engage the opening 106 of the key coupling member 104. Accordingly, the opening 106 may serve to engage a key ring as well as to retain the memory card holder 18 adjacent to a front portion of the memory card case.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. According, unless specifically indicated herein, the order and grouping of the steps is not a limitation of the present invention.

What is claimed is:

1. A memory card container, comprising:

a memory card holder, said memory card holder including a front region and a rear region, said front region being configured to engage said rear region to define therebetween a first compartment, said first compartment being configured to contain a memory card; and a memory card case, said memory card case including a front portion and a rear portion, said front portion being configured to engage said rear portion to define therebetween a second compartment, said second compartment being configured to contain said memory card holder, one of said front portion and said rear portion including a retaining member, said retaining member being configured to engage said memory card holder to retain said memory card holder in said second compartment, said front portion including an observation window, said observation window being configured to provide a view of said memory card holder in said second compartment.

2. The memory card container of claim 1, wherein said front region is movably coupled to said rear region to provide movement of said front region, with respect to said rear region, between an open position and a closed position, said front region in said closed position being configured to engage said rear region to contain said memory card.

3. The memory card container of claim 1, wherein one of said front region and said rear region includes a key coupling member, said key coupling member being configured to engage a key ring.

4. The memory card container of claim 1, wherein said retaining member is configured to retain said memory card holder in said second compartment such that said memory card holder is adjacent to said observation window.

5. The memory card container of claim 1, wherein said observation window is formed as an opening in said front portion.

6. The memory card container of claim 1, wherein one of said front portion and said rear portion includes a disc coupling member, said disc coupling member being configured to engage a compact disc to retain said compact disc in said second compartment.

7. The memory card container of claim 1, wherein said front portion is movably coupled to said rear portion to provide movement of said front portion, with respect to said rear portion, between an open position and a closed position, said front portion in said closed position being configured to engage said rear portion to contain said memory card holder.

8. The memory card container of claim 4, wherein said front region is substantially transparent, said retaining member being configured to retain said memory card holder in said second compartment such that said front region is adjacent to said observation window, said observation window being configured to provide a view of said memory card through said front region.

9. A memory card container, comprising:

a memory card case, said memory card case including a front portion and a rear portion, said front portion including an observation window and a retaining member, said retaining member being configured to retain a memory card holder such that said memory card holder is adjacent to said observation window, said front portion being movably coupled to said rear portion to provide movement of said front portion, with respect to said rear portion, between an open position and a closed position, said front portion in said closed position being configured to engage said rear portion to contain said memory card holder between said front portion and said rear portion.

10. The memory card container of claim 9, wherein said front portion includes a front plate and a front wall, said front plate including said observation window and said retaining member, said retaining member being configured to retain said memory card holder such that said memory card holder is adjacent to said observation window at an inner side of said front plate, said front wall being disposed adjacent to a periphery of said front plate and extending from said inner side of said front plate, said rear portion including a rear plate and a rear wall, said rear wall being disposed adjacent to a periphery of said rear plate and extending from an inner side of said rear plate, said front wall being configured to engage said rear wall to contain said memory card holder between said front portion and said rear portion.

11. The memory card container of claim 9, further comprising said memory card holder, said memory card holder including a front region and a rear region, said front region being movably coupled to said rear region to provide movement of said front region, with respect to said rear region, between an open position and a closed position, said front region in said closed position being configured to engage said rear region to contain a memory card between said front region and said rear region.

12. The memory card container of claim 10, wherein said memory card case further includes a spine member hingedly coupled to said front plate and to said rear plate.

13. The memory card container of claim 10, wherein said observation window is formed as an opening in said front plate.

14. The memory card container of claim 11, wherein said front region is substantially transparent, said retaining member being configured to retain said memory card holder such that said front region is adjacent to said observation window.

15. A memory card container, comprising:

a memory card holder, said memory card holder including a front region and a rear region, said front region being substantially transparent, one of said front region and said rear region including a key coupling member, said front region being movably coupled to said rear region to provide movement of said front region, with respect to said rear region, between an open position and a closed position, said front region in said closed position being configured to engage said rear region to contain at least one memory card between said front region and said rear region.

16. The memory card container of claim 15, further comprising:

a memory card case, said memory card case including a front portion and a rear portion, said front portion including an observation window and a retaining member, said retaining member being configured to retain said memory card holder such that said memory card holder is adjacent to said observation window, said front portion being movably coupled to said rear portion to provide movement of said front portion, with respect to said rear portion, between an open position and closed position, said front portion in said closed position being configured to engage said read portion to contain said memory card holder between said front portion and said rear portion.

* * * * *